United States Patent
Hiramaki

(10) Patent No.: US 8,824,739 B2
(45) Date of Patent: Sep. 2, 2014

(54) EYELID-DETECTION DEVICE, EYELID-DETECTION METHOD, AND RECORDING MEDIUM

(75) Inventor: Takashi Hiramaki, Nagoya (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 14/111,394

(22) PCT Filed: Apr. 15, 2011

(86) PCT No.: PCT/JP2011/059442
§ 371 (c)(1),
(2), (4) Date: Oct. 11, 2013

(87) PCT Pub. No.: WO2012/140782
PCT Pub. Date: Oct. 18, 2012

(65) Prior Publication Data
US 2014/0037144 A1 Feb. 6, 2014

(51) Int. Cl.
*G06K 9/00* (2006.01)
*G06K 9/46* (2006.01)
*H04N 5/225* (2006.01)

(52) U.S. Cl.
CPC .......... *G06K 9/00281* (2013.01); *G06K 9/4604* (2013.01); *G06K 9/00248* (2013.01); *G06K 9/00832* (2013.01)
USPC .......................................... 382/103; 348/169

(58) Field of Classification Search
USPC ............ 382/103, 104, 236; 348/78, 154, 155, 348/169, 170, 171, 172, 352; 340/439, 576
See application file for complete search history.

(56) References Cited

U.S. PATENT DOCUMENTS

| 4,841,575 A | 6/1989 | Welsh et al. | |
|---|---|---|---|
| 5,719,951 A * | 2/1998 | Shackleton et al. | 382/118 |
| 2008/0226175 A1 | 9/2008 | Suzuki et al. | |
| 2009/0244274 A1 * | 10/2009 | Morita et al. | 348/78 |

FOREIGN PATENT DOCUMENTS

| JP | 62-120179 A | 6/1987 |
|---|---|---|
| JP | 5-508951 A | 12/1993 |
| JP | 2004-192552 A | 7/2004 |
| JP | 2011-86051 A | 4/2011 |

OTHER PUBLICATIONS

Alan L. Yuille et al., "Feature extraction from faces using deformable templates", IEEE computer Society Conference on Computer Vision and Pattern Recognition, 1989, Proceedings CVPR 1989, pp. 104-109.
International Search Report for PCT/JP2011/059442 dated May 17, 2011.

* cited by examiner

*Primary Examiner* — Abolfazl Tabatabai
(74) *Attorney, Agent, or Firm* — Sughrue Mion, PLLC

(57) ABSTRACT

A lower eyelid search window (W2) matching the pixels constituting the edge of a lower eyelid is transformed so that the lower eyelid search window (W2) fits the pixels constituting the edge of the lower eyelid. Then, the position of the centroid of the transformed lower eyelid search window (W2) is set as the lower eyelid reference position. Consequently, the lower eyelid reference position can be accurately set even if the lower eyelid search window (W2) is different in shape from the edge of the lower eyelid. Then, it is possible to accurately detect the degree of opening of the eyes of a driver and thus accurately determine the degree of wakefulness of the driver.

12 Claims, 17 Drawing Sheets

FIG.5A

HORIZONTAL EDGE DETECTION OPERATOR

| 1 | 2 | 1 |
|---|---|---|
| 0 | 0 | 0 |
| −1 | −2 | −1 |

FIG.5B

VERTICAL EDGE DETECTION OPERATOR

| 1 | 0 | −1 |
|---|---|---|
| 2 | 0 | −2 |
| 1 | 0 | −1 |

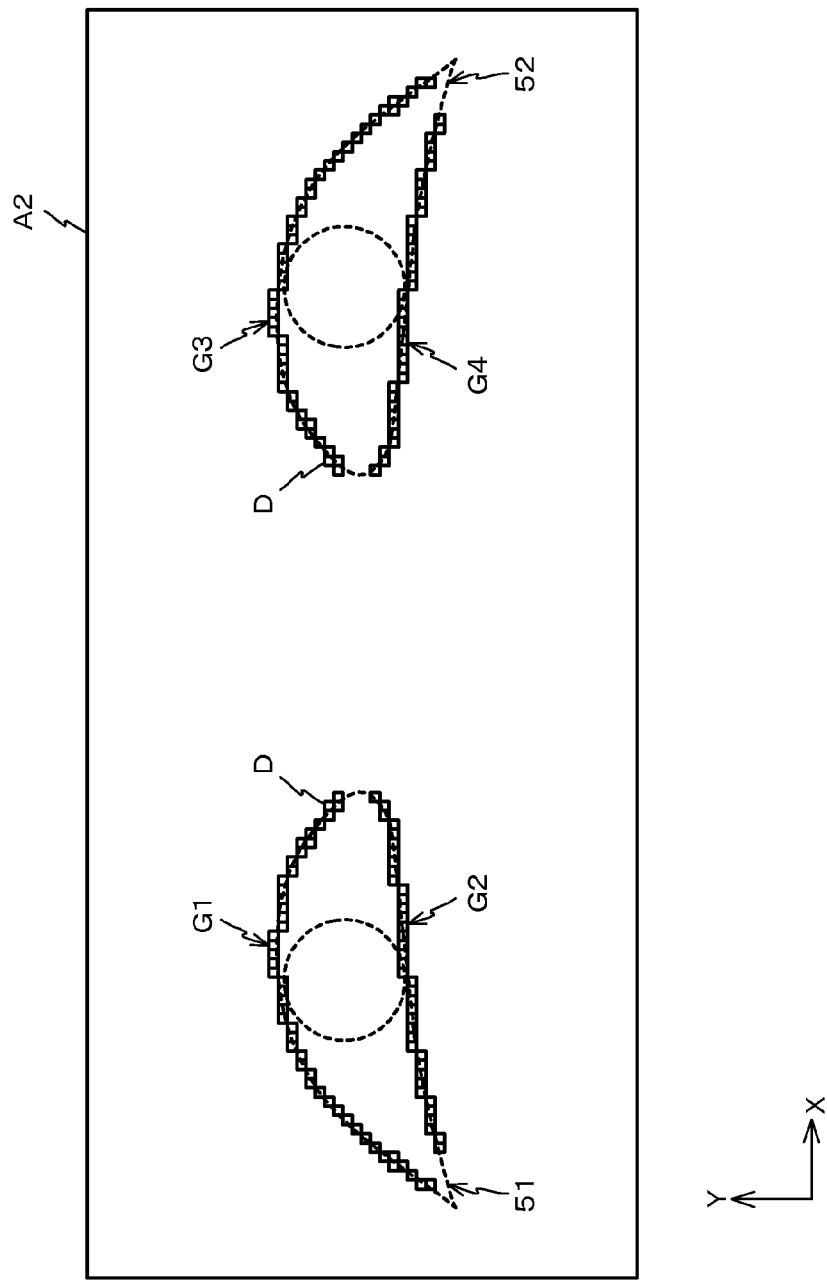

EYELID-DETECTION DEVICE, EYELID-DETECTION METHOD, AND RECORDING MEDIUM

CROSS REFERENCE TO RELATED APPLICATIONS

This application is a National Stage of International Application No. PCT/JP2011/059442 filed Apr. 15, 2011, the contents of which are incorporated herein by reference in their entirety.

TECHNICAL FIELD

The present invention relates to an eyelid detection device, eyelid detection method, and recording medium, and particularly to an eyelid detection device detecting the eyelids appearing in an eye image and an eyelid detection method and a recording medium storing a program for detecting the eyelids appearing in an eye image.

BACKGROUND ART

Recently, traffic accident fatalities have been decreasing; however, many traffic accidents still occur. Traffic accidents are caused by various factors. Driving while not being fully awake, namely drowsy driving, is one of the factors causing accidents.

Various techniques for detecting a lowered degree of wakefulness of a driver have been proposed (for example, see Patent Literature 1).

CITATION LIST

Patent Literature

PTL 1: Unexamined Japanese Patent Application Kokai Publication No. 2004-192552.

SUMMARY OF INVENTION

Technical Problem

The device disclosed in the Patent Literature 1 determines whether the driver is closing his/her eyes comprehensively based on the vertical dimensions of the eyes appearing in an image of the face of the driver, the distance between a curve along the upper eyelid and the line connecting the ends of the curve, and the radius of curvature of the curve. However, if the image is subjected to so-called whiteout, it is sometimes difficult to accurately measure the vertical dimensions of the eyes.

Similarly, if the image is unclear, a curve along the upper eyelid is not correctly defined. In such a case, the distance between the curve along the upper eyelid and the line connecting the ends of the curve are not correlated. Therefore, it is difficult to accurately determine whether the driver is closing his/her eyes.

Furthermore, the determination based on the radius of curvature does not directly measure the degree of opening of the eyes of the driver. Then, the degree of opening of the eyes may not be accurately calculated depending on the shape of the eyes of the driver.

The present invention is invented in view of the above situation and an exemplary objective of the present invention is to accurately determine whether the driver is closing his/her eyes, based on an image of the eyes of the driver.

Solution to Problem

In order to achieve the above objective, the eyelid detection device according to a first exemplary aspect of the present invention comprises:

a extractor extracting the pixels of which the edge values satisfy given conditions from the pixels constituting an image of the eyes of a driver;

a calculator calculating the evaluation value of the pixels overlapping with an window having a shape corresponding to the eyelids of the driver while scanning the image using the window;

a transformer transforming the window at the position where the evaluation value is maximized to increase the evaluation value of the window; and a setter setting the reference positions of the eyelids according to the transformed window.

The eyelid detection method according to a second exemplary aspect of the present invention includes the following steps:

extracting the pixels of which the edge values satisfy given conditions from the pixels constituting an image of the eyes of a driver;

calculating the evaluation value of the pixels overlapping with an window having a shape corresponding to the eyelids of the driver while scanning the image using the window;

transforming the window at the position where the evaluation value is maximized to increase the evaluation value of the window; and setting the reference positions of the eyelids according to the transformed window.

The recording medium on which is recorded a program according to a third exemplary aspect of the present invention allows a computer to execute the following procedures:

extracting the pixels of which the edge values satisfy given conditions from the pixels constituting an image of the eyes of a driver;

calculating the evaluation value of the pixels overlapping with an window having a shape corresponding to the eyelids of the driver while scanning the image using the window;

transforming the window at the position where the evaluation value is maximized to increase the evaluation value of the window; and setting the reference positions of the eyelids according to the transformed window.

Advantageous Effects of Invention

The present invention transforms the window matching the edge of an eyelid appearing in an image. Then, the present invention sets the reference position of the eyelid edge in accordance with the transformed window. Then, the eyelid reference position can be accurately set even if the shape of the eyelid appearing in the image and the shape of the window are different. Consequently, whether the driver is closing his/her eyes can be accurately determined.

BRIEF DESCRIPTION OF DRAWINGS

FIG. 5A is an illustration showing the horizontal edge detection operator;

FIG. 5B is an illustration showing the vertical edge detection operator;

FIG. 6 is an illustration showing the pixels constituting the upper and lower eyelids;

DESCRIPTION OF EMBODIMENTS

Embodiment 1

Figure 1:
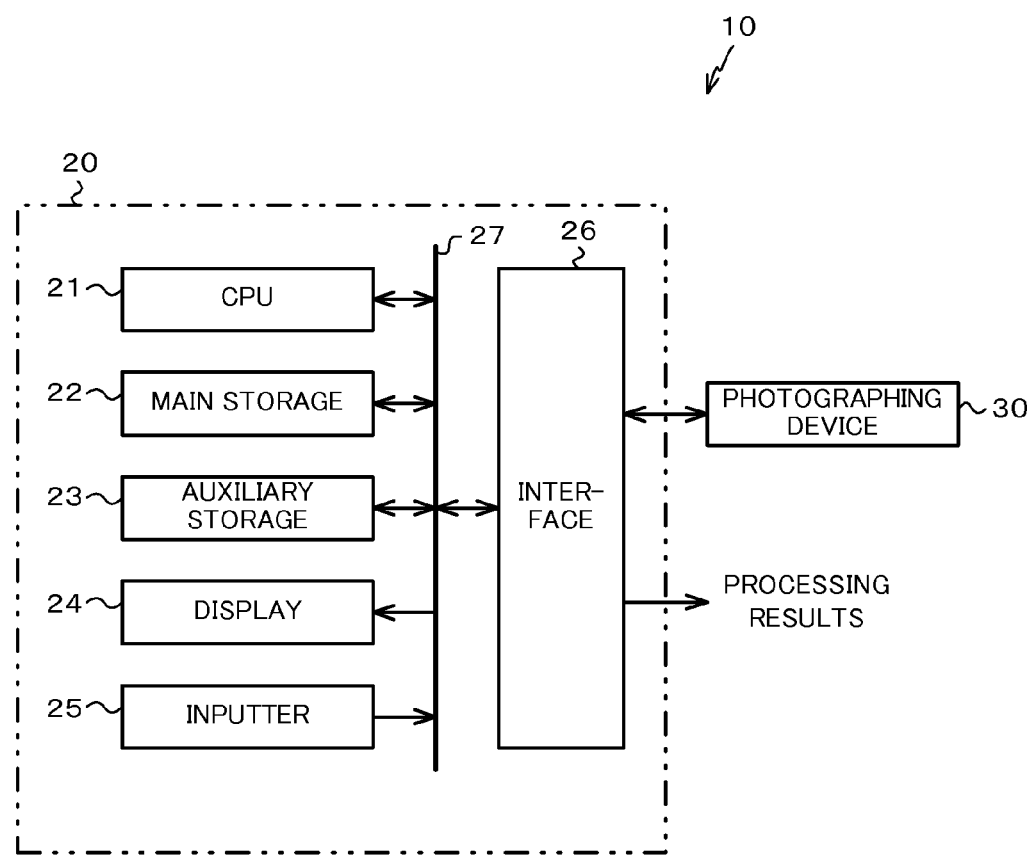
FIG. 1 is a block diagram of the eyelid detection device according to Embodiment 1.

Embodiment 1 of the present invention will be described hereafter with reference to the drawings. FIG. 1 is a block diagram showing the general configuration of an eyelid detection device 10 according to this embodiment. The eyelid detection device 10 detects the positions of the eyelids in an image in which the face of the driver appears and calculates the degree of opening of the eyes of the driver based on the detection results. As shown in FIG. 1, the eyelid detection device 10 has a calculation device 20 and a photographing device 30.

Figure 2:
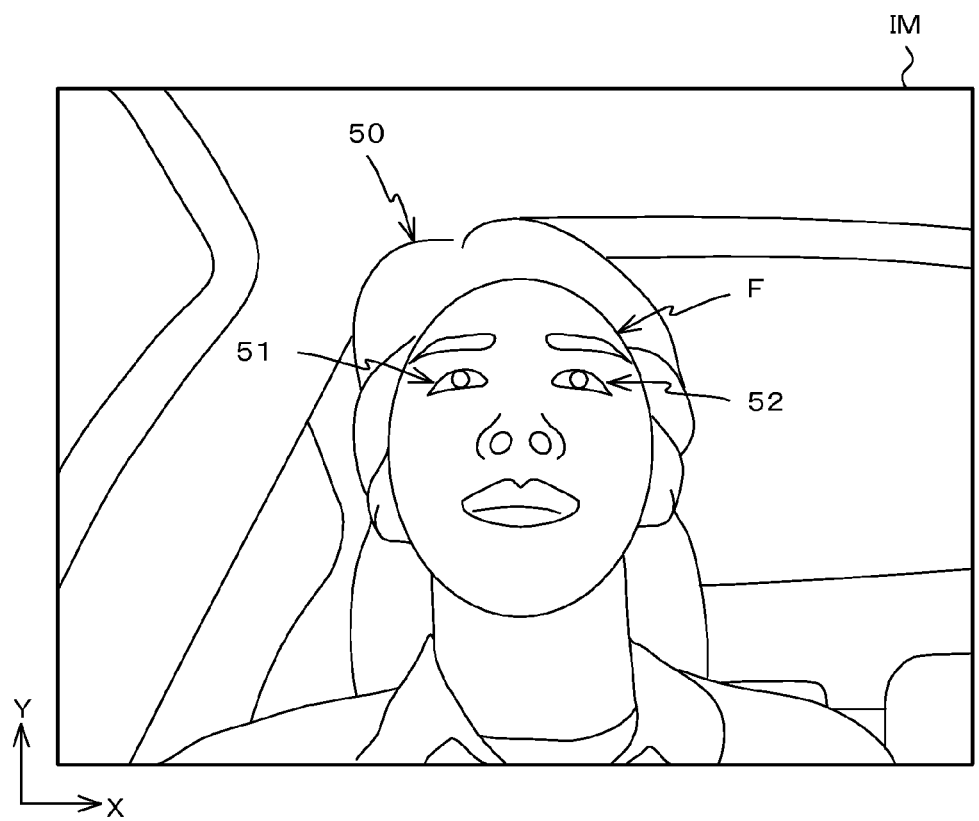
FIG. 2 is an illustration showing an image photographed by an photographing device.

The photographing device 30 photographs a subject to capture an image, converts the captured image to electric signals, and outputs the electric signals. FIG. 2 shows an image IM photographed by the photographing device 30. As seen with reference to the image IM, the photographing device 30 is installed, for example, on the steering column or steering wheel of a vehicle with the installation angle and field angle adjusted so that the face of a driver 50 sitting in the driver seat of the vehicle is situated nearly at the center of the field of view. Then, the photographing device 30 photographs the face of the driver 50 in a given cycle and outputs information regarding the photographic image to the calculation device 20.

Here, an XY-coordinate system with the origin at the bottom left corner of the image IM is defined for convenience of explanation and the following explanation will be made using the XY-coordinate system as appropriate.

Returning to FIG. 1, the calculation device 20 is a computer having a CPU (central processing unit) 21, a main storage 22, an auxiliary storage 23, a display 24, an inputter 25, and an interface 26.

The CPU 21 reads and executes programs stored in the auxiliary storage 23. Specific operation of the CPU 21 will be described later.

The main storage 22 has a volatile memory such as a RAM (random access memory). The main storage 22 is used as the work area of the CPU 21.

The auxiliary storage 23 has a nonvolatile memory such as a ROM (read only memory), magnetic disc, and semiconductor memory. The auxiliary storage 23 stores programs executed by the CPU 21 and various parameters. The auxiliary storage 23 further stores information regarding images output from the photographing device 30 and information including the results of processing by the CPU 21 in sequence.

The display 24 has a display unit such as a LCD (liquid crystal display). The display 24 displays the results of processing by the CPU 21.

The inputter 25 has input keys and/or a pointing device such as a touch panel. Commands from the operator are entered via the inputter 25 and given to the CPU 21 via a system bus 27.

The interface 26 is configured to include a serial interface or LAN (local area network) interface and the like. The photographing device 30 is connected to the system bus 27 via the interface 26.

Figure 3:
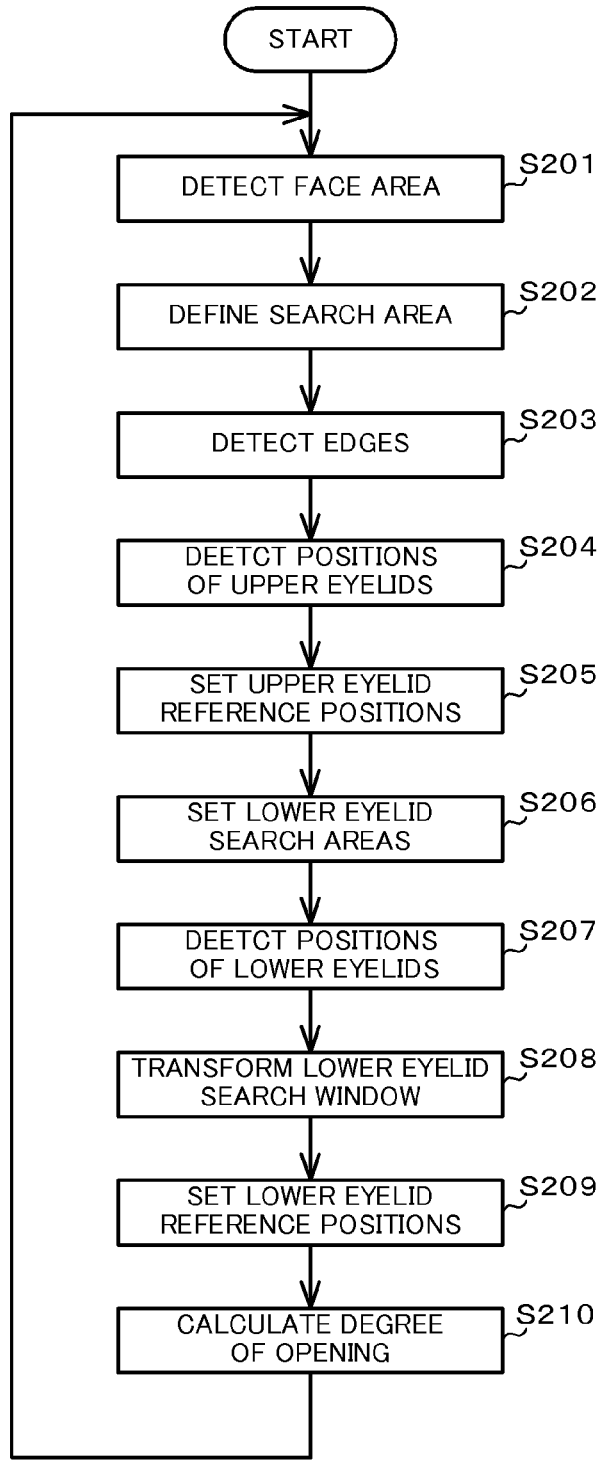
FIG. 3 is a flowchart showing a series of processing executed by the CPU.

The flowchart of FIG. 3 corresponds to a series of processing algorithm executed by the CPU 21. Operation of the eyelid detection device 10 will be described hereafter with reference to FIG. 3. A series of processing shown in the flowchart of FIG. 3 is executed, for example, when the ignition switch of the vehicle is turned on. Here, it is assumed that the image IM shown in FIG. 2 is photographed by the photographing device 30.

First, in the first step S201, the CPU 21 detects a face area A1 in which the eyes, nose, and the like constituting the face of the driver appear in the image IM output from the photographing device 30.

Figure 4:
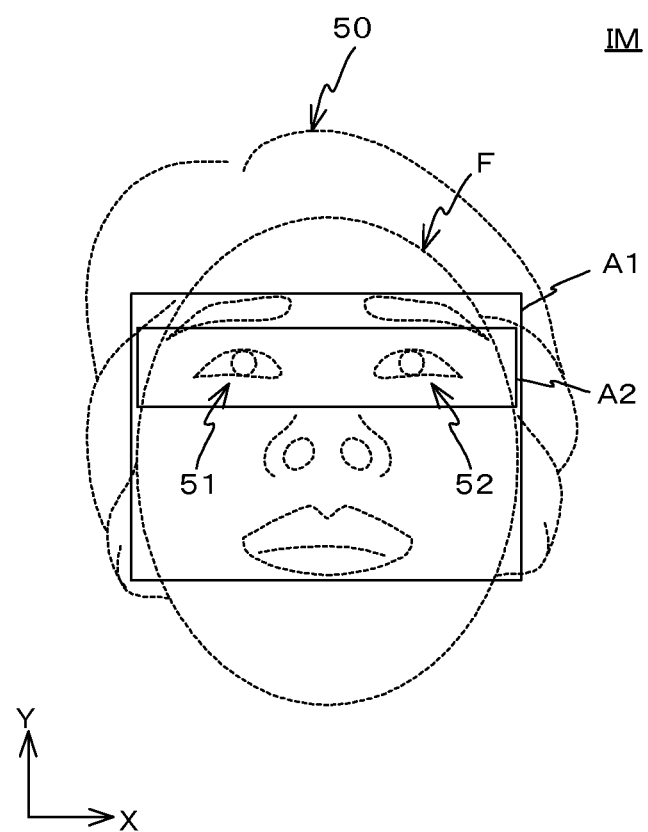
FIG. 4 is an illustration showing the face area and the search area.

The face area A1 is detected as follows. First, the image IM is processed using a Sobel filter to extract the edges contained in the image IM. Then, the edge presenting the outline F of the face of the driver is detected among the extracted edges. Then, the edges presenting the eyebrows and mouth of the driver are detected among the edges contained in the area enclosed by the outline F of the face of the driver so as to roughly identify the positions of the eyebrows and mouth of the driver. As the positions of the eyebrows and mouth are identified, the CPU 21 detects, for example as shown in FIG. 4, the smallest rectangular area nearly equal in dimension in the X-axis direction to the outline of the face and containing the eyebrows and mouth of the driver 50 as the face area A1.

In the next step S202, the CPU 21 defines a search area A2 with which an eyelid detection procedure is executed. The positions of the eyebrows, eyes, nose, and mouth constituting a face are more or less different among individuals; however, their positions can roughly be identified based on the outline and parts such as eyebrows and eyes of the face. Then, an area in which the eyes are situated can be specified in the face area A1 defined to contain the eyebrows at the upper end and the mouth at the lower end with some degree of accuracy. Then, the CPU 21 defines a rectangular search area A2 that is long in the X-axis direction below the image of the eyebrows contained in the face area A1.

In the next step S203, the CPU 21 executes a procedure to detect the edges in the search area A2. For detecting the edges, the CPU 21 uses a horizontal edge detection operator shown in FIG. 5A and a vertical edge detection operator shown in FIG. 5B.

For example, the CPU 21 first uses the horizontal edge detection operator to calculate the edge values of the pixels. The edge value of a pixel is positive when the pixel of which the edge value is to be calculated has a brighter pixel above it (on the +Y side) and has a less bright pixel below it (on the −Y side). On the other hand, the edge value of a pixel is negative when the pixel of which the edge value is to be calculated has a less bright pixel above it (on the +Y side) and has a brighter pixel below it (on the −Y side). Then, the CPU 21 extracts the pixels having an edge value equal to or greater than a first threshold (a given condition) and the pixels having an edge value equal to or lower than a second threshold (a given condition).

Then, the CPU 21 uses the vertical edge detection operator to calculate the edge values of the pixels. The edge value of a pixel is positive when the pixel of which the edge value is to be calculated has a brighter pixel to the left (on the −X side) and has a less bright pixel to the right (on the +X side). On the other hand, the edge value of a pixel is negative when the pixel of which the edge value is to be calculated has a less bright pixel to the left (on the −X side) and has a brighter pixel to the right (on the +X side). Then, the CPU 21 extracts the pixels having an edge value equal to or greater than the first threshold (a given condition) and the pixels having an edge value equal to or lower than the second threshold (a given condition).

Consequently, for example as shown in FIG. 6, the pixels D constituting the edges of the upper and lower eyelids of the eyes 51 and 52 are extracted. In the following explanation, the edge of the upper eyelid of the right eye 51 is referred to as a group of pixels G1 and the edge of the lower eyelid thereof is referred to as a group of pixels G2. Furthermore, the edge of the upper eyelid of the left eye 52 is referred to as a group of pixels G3 and the edge of the lower eyelid thereof is referred to as a group of pixels G4.

Figure 7:
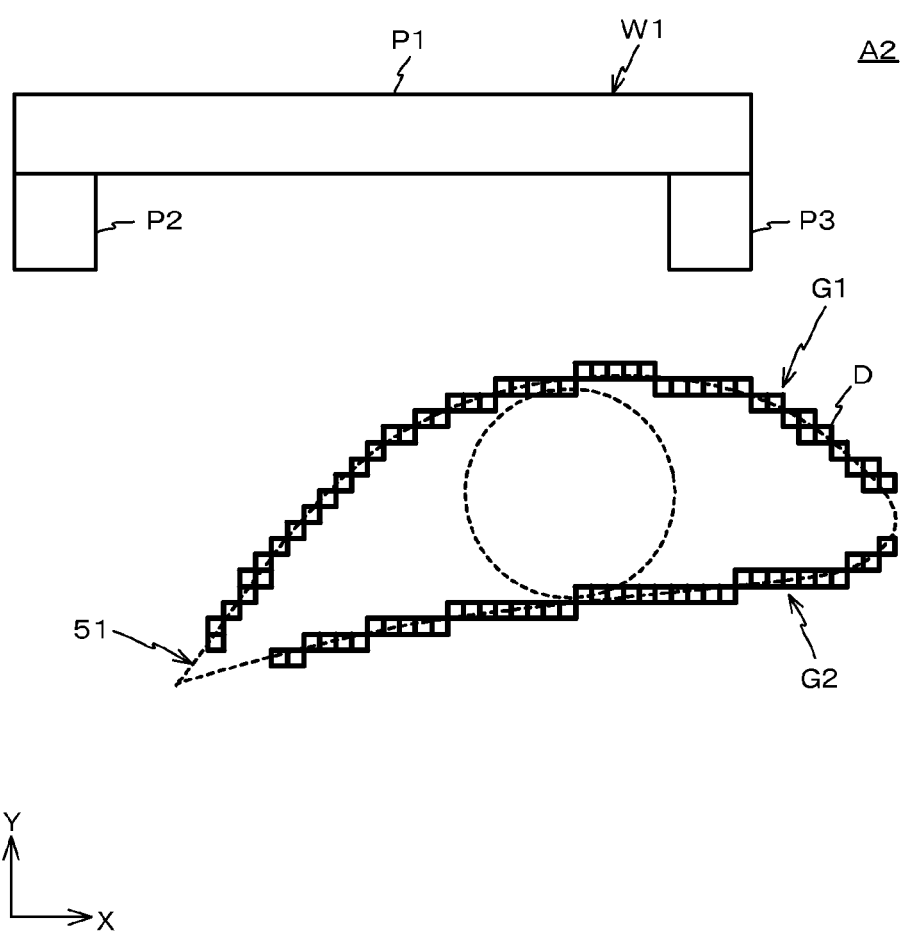
FIG. 7 is an illustration showing groups of pixels and the upper eyelid search window.

In the next step S204, the CPU 21 conducts scanning using an upper eyelid search window to detect the positions of the upper eyelids. FIG. 7 is an illustration showing the groups of pixels G1 and G2 and an upper eyelid search window W1 for detecting the upper eyelid presented by the group of pixels G1. As shown in FIG. 7, the upper eyelid search window W1 comprises a rectangular horizontal edge window P1 that is long in the X-axis direction and vertical edge windows P2 and P3 defined at the ends of the horizontal edge window P1.

The CPU 21 moves the upper eyelid search window W1 within the search area A2, for example, by a distance corresponding to one pixel at a time. Simultaneously, the CPU 21 calculates the total of the edge values of the pixels D overlapping with the horizontal edge window P1 plus a value obtained by subtracting the total of the edge values of the pixels overlapping with the vertical edge window P3 from the total of the edge values of the pixels D overlapping the vertical edge window P2 as the evaluation value in sequence. Then, the CPU 21 detects the position of the upper eyelid search window W1 where the evaluation value is maximized as the position of the upper eyelid of the right eye 51.

Figure 8:
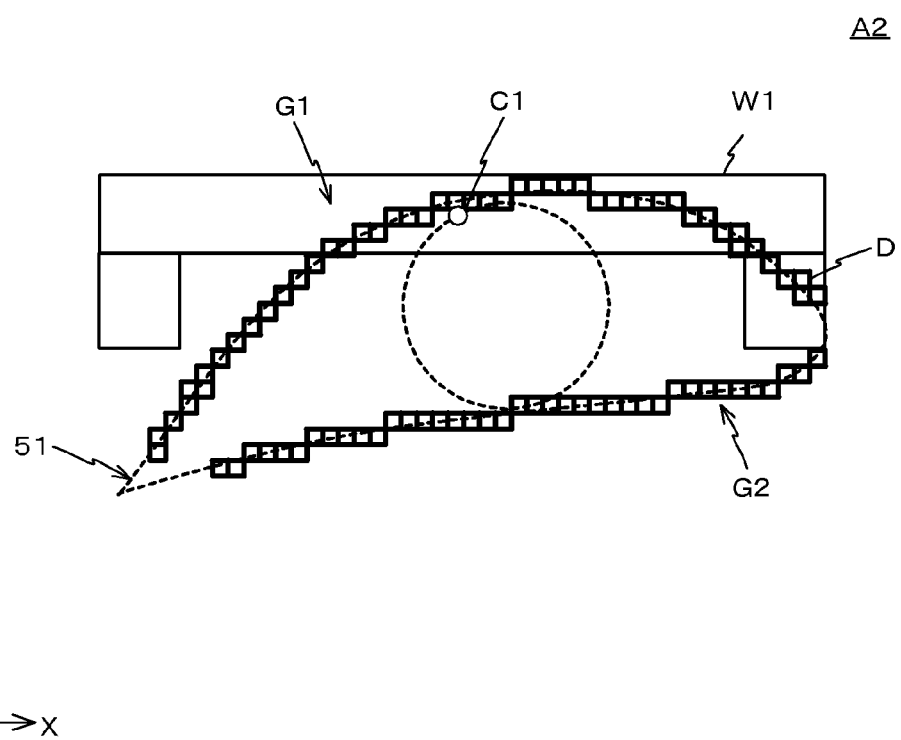
FIG. 8 is an illustration showing the positional relationship between a group of pixels and the upper eyelid search window when the evaluation value is maximized.

FIG. 8 is an illustration showing the positional relationship between the group of pixels G1 and upper eyelid search window W1 when the evaluation value is maximized. As shown in FIG. 8, the upper eyelid search window W1 overlaps with the group of pixels G1 when the evaluation value is maximized. After detecting the position of the upper eyelid of the right eye 51, the CPU 21 detects the position of the upper eyelid of the left eye 52 in the same procedure.

In the next step S205, the CPU 21 sets the reference positions of the detected upper eyelids of the right and left eyes 51 and 52. More specifically, as shown in FIG. 8, the CPU 21 sets the position on the XY-coordinate system that coincides with the centroid of the upper eyelid search window W1 overlapping with the group of pixels G3 as the upper eyelid reference position C1 of the right eye 51. Similarly, the CPU 21 sets the position on the XY-coordinate system that coincides with the centroid of the upper eyelid search window W1 overlapping with the group of pixels G3 as the upper eyelid reference position C1 of the left eye 52.

Figure 9:
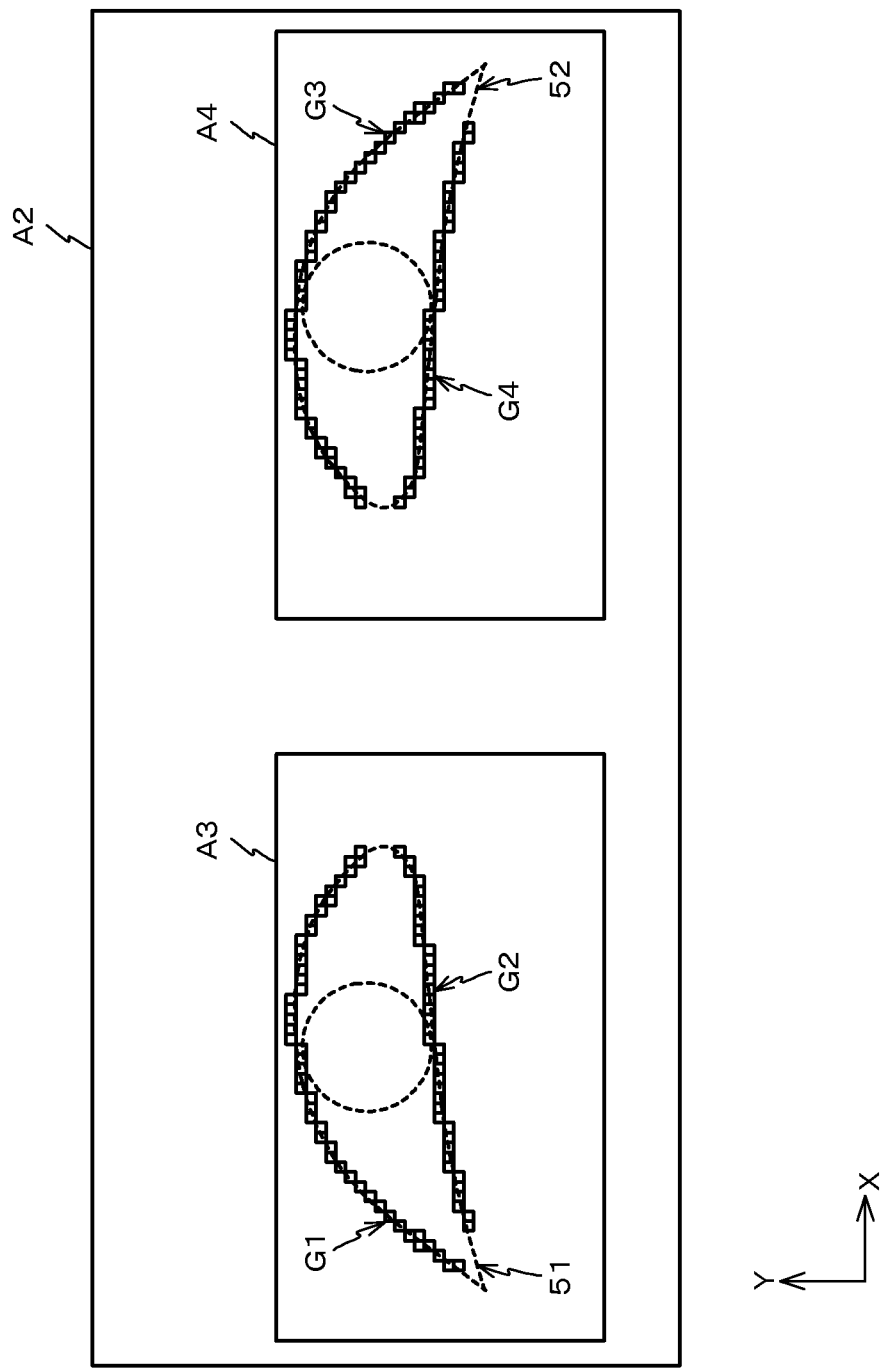
FIG. 9 is an illustration showing the lower eyelid search areas.

In the next step S206, the CPU 21 sets lower eyelid search areas. The lower eyelids are situated below the upper eyelids. Then, as shown in FIG. 9, the CPU 21 sets a rectangular lower eyelid search area A3 in the user part of which the group of pixels G1 constituting the edge of the upper eyelid is situated. Similarly, the CPU 21 sets a rectangular lower eyelid search area A4 in the upper part of which the group of pixels G3 is situated.

Incidentally, the above-described processing in the steps S201 through S206 is disclosed in, for example, Unexamined Japanese Patent Application Kokai Publication No. 2008-225838.

Figure 10:
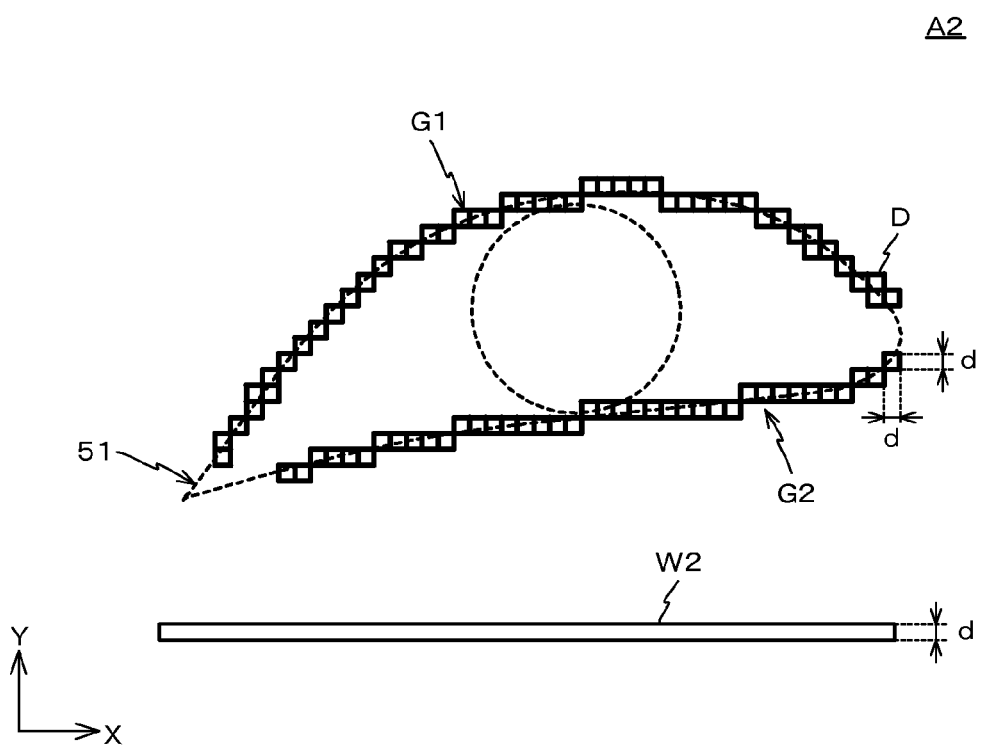
FIG. 10 is an illustration showing groups of pixels and the lower eyelid search window.

In the next step S207, the CPU 21 conducts scanning using a lower eyelid search window to detect the positions of the lower eyelids. FIG. 10 is an illustration showing the groups of pixels G1 and G2 and a lower eyelid search window W2. As shown in FIG. 10, the lower eyelid search window W2 is a window that is long in the X-axis direction. The lower eyelid search window W2 is equal in dimension in the Y-axis direction to a pixel D. Furthermore, the lower eyelid search window W2 is equal in dimension in the X-axis direction to the upper eyelid search window W1. Here, it is assumed that the dimensions of a pixel D in the X-axis direction and in the X-axis direction and the dimension of the lower eyelid search window W2 in the Y-axis direction are each d.

The CPU 21 moves the lower eyelid search window W2 within the lower eyelid search area A3, for example, by a distance corresponding to one pixel at a time. Simultaneously, the CPU 21 calculates the total of the edge values of the pixels D overlapping with the lower eyelid search window W2 as the evaluation value in sequence. Then, the CPU 21 detects the position of the lower eyelid search window W2 where the evaluation value is minimized as the position of the lower eyelid of the right eye 51.

Figure 11:
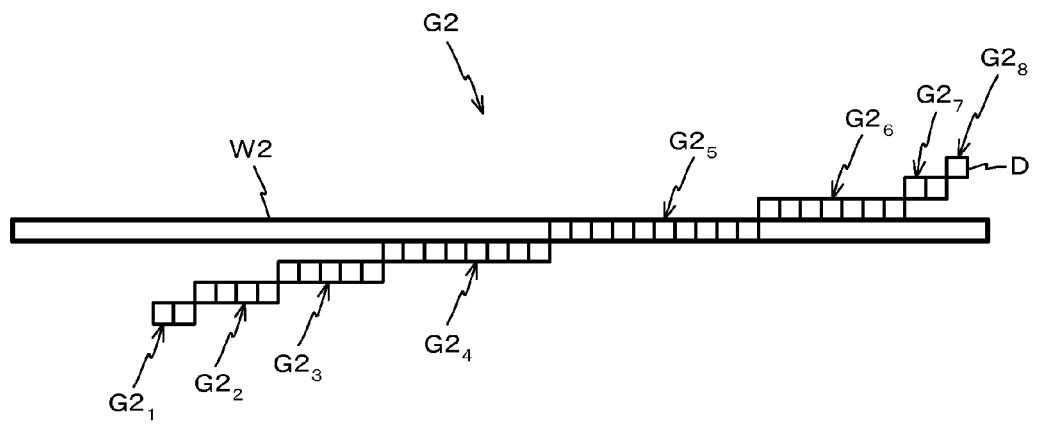
FIG. 11 is an illustration showing the positional relationship between a group of pixels and the lower eyelid search window when the evaluation value is maximized.

FIG. 11 is an illustration showing the positional relationship between the group of pixels G2 and lower eyelid search window W2 when the evaluation value is minimized. As shown in FIG. 11, when the group of pixels G2 comprises groups $G2_N$ each consisting of multiple pixels at the same position in the Y-axis direction, the lower eyelid search window W2 overlaps with one of the groups $G2_N$. In this embodiment, the lower eyelid search window W2 overlaps with the pixels D constituting a group $G2_5$. Furthermore, the CPU 21 executes the above-described processing using the lower eyelid search window W2 also in the lower eyelid search area A4.

Figure 12:
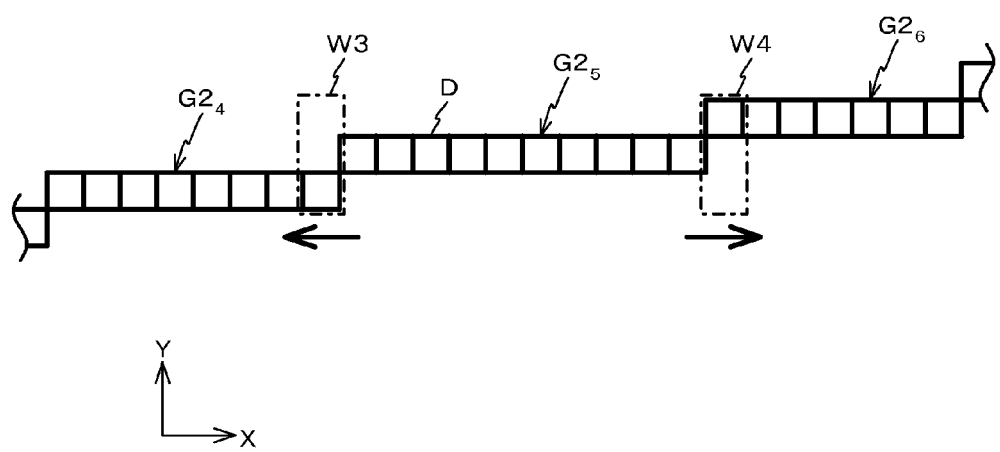
FIG. 12 is an illustration showing the pixel search windows.

In the next step S208, the CPU 21 transforms the lower eyelid search window W2 based on the distribution of the pixels constituting the group of pixels G2. More specifically, the CPU 21 sets, as shown in FIG. 12, pixel search windows W3 and W4 having a dimension of 3d in the Y-axis direction and a dimension of d in the X-axis direction at the ends of a group $G2_5$ overlapping with the lower eyelid search window W2. Then, the CPU 21 moves the pixel search window W3 in the −X direction to extract the pixels D overlapping with the pixel search window W3. Consequently, the pixels constituting a group G2$_4$ are extracted. Similarly, the CPU 21 moves the pixel search window W4 in the +X direction to extract the pixels D overlapping with the pixel search window W4. Consequently, the pixels constituting a group G2$_6$ are extracted.

Figure 13:
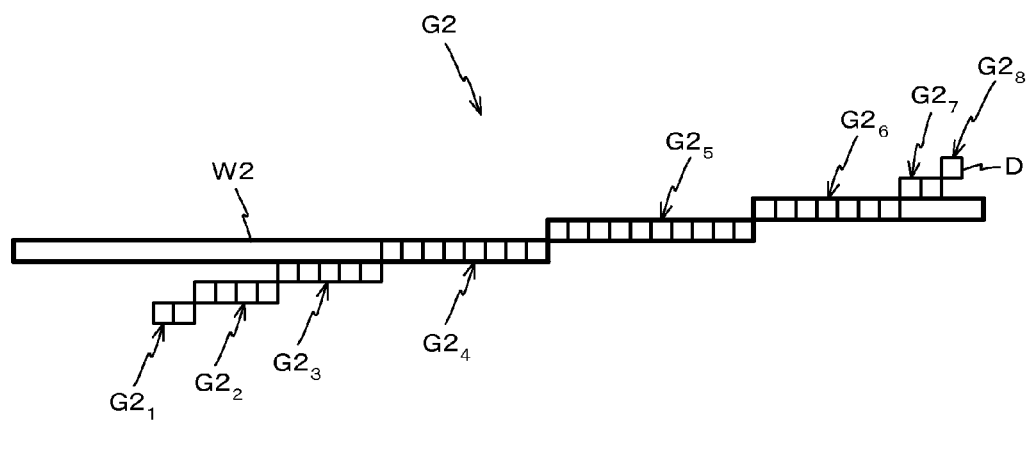
FIG. 13 is an illustration for explaining the procedure to transform the lower eyelid search area.

Then, the CPU 21 transforms the lower eyelid search window W2 so that the lower eyelid search window W2 overlaps with the pixels D constituting the group G2$_5$ and already overlapping with the pixel search window W4 and the pixels D constituting the groups G2$_4$ and G2$_6$ and extracted with the pixel search windows W3 and W4 as shown in FIG. 13. Consequently, the lower eyelid search window W2 comprises three rectangular frames as shown in FIG. 13.

Then, the CPU 21 sets the pixel search window W3 at the end of the group G2$_4$ in the −X direction and the pixel search window W4 at the end of the group G2$_6$ in the +X direction. Then, the CPU 21 moves the pixel search windows W3 and W4 in the −X direction and in the +X direction, respectively, to extract the pixels overlapping with the pixel search windows W3 and W4 and constituting groups G2$_3$ and G2$_7$, respectively.

Figure 14:
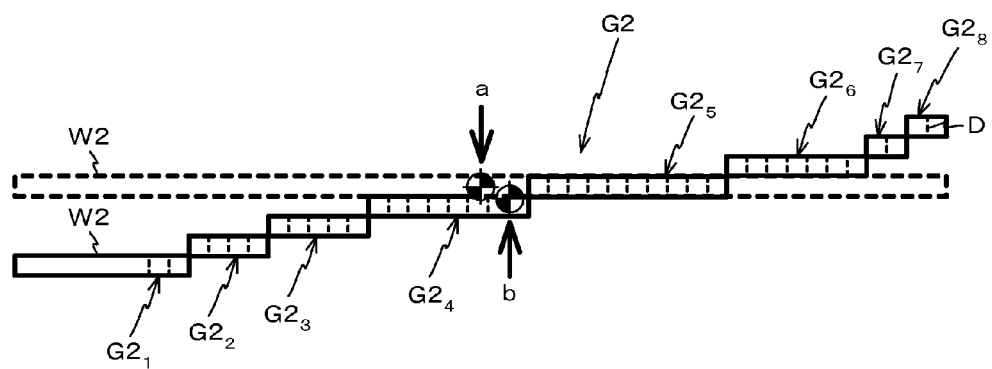
FIG. 14 is an illustration showing the centroid of the lower eyelid search area.

Then, the CPU 21 transforms the lower eyelid search window W2 so that the lower eyelid search window W2 overlaps with the extracted pixels. The CPU 21 repeatedly executes the above processing. Consequently, as shown in FIG. 14, the lower eyelid search window W2 is transformed so that the lower eyelid search window W2 completely overlaps with the group of pixels G2 presenting the edge of the lower eyelid. Furthermore, the CPU 21 executes the above-described processing also on the lower eyelid search window W2 overlapping with the group of pixels G4.

In the next step S209, the CPU 21 sets lower eyelid reference positions. More specifically, the CPU 21 first calculates the centroid of the lower eyelid search window W2 transformed in the step S208. More specifically, the CPU 21 calculates the position specified by the average coordinates of the pixels overlapping with the transformed lower eyelid search window W2 as the centroid. For example, if the pixels overlapping with the lower eyelid search window W2 have the coordinates (x1, y1), (x2, y2), . . . (xn, yn), respectively, the CPU 21 calculates the position specified by an X-coordinate of (x1+x2+ . . . +xn) In and a Y-coordinate of (y1+y2+ . . . +yn)/n as the centroid.

FIG. 14 shows the centroid of the untransformed lower eyelid search window W2 at the position marked by an arrow a and the centroid of the transformed lower eyelid search window W2 at the position marked by an arrow b. As shown in FIG. 14, the centroid of the lower eyelid search window W2 shifts from the position marked by the arrow a to the position marked by the arrow b as the lower eyelid search window W2 is transformed. After calculating the centroid of the transformed lower eyelid search window W2, the CPU 21 sets the position of the calculated centroid on the XY-coordinates as a lower eyelid reference position C2. Furthermore, the CPU 21 executes the above-described processing also on the lower eyelid search window W2 overlapping with the group of pixels G4.

Figure 15:
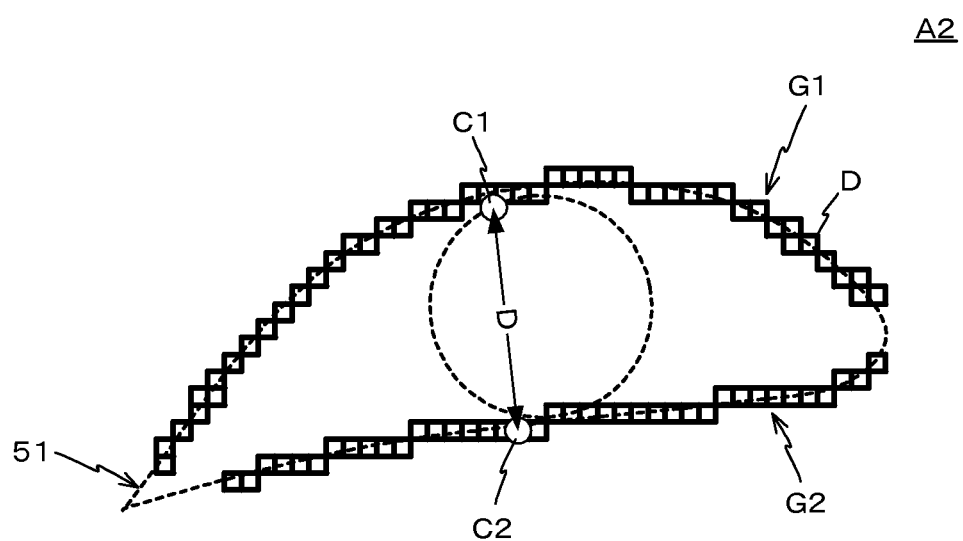
FIG. 15 is an illustration showing the reference positions of the lower and upper eyelids.

In the next step S210, as shown in FIG. 15, the CPU 21 measures the distance between the upper eyelid reference position C1 and the lower eyelid reference position C2 in each of the right eye 51 and left eye 52. Then, the CPU 21 outputs the result of comparison of the distance with a given threshold as the degree of opening. Consequently, using the degree of opening as an indicator, the degree of wakefulness of the driver 50 can be determined.

As described above, for detecting a lower eyelid, Embodiment 1 first conducts scanning using the lower eyelid search window W2. Then, the lower eyelid search window W2 at the position where the total of the edge values of the pixels D overlapping with the lower eyelid search window W2 (the evaluation value) is maximized is transformed so that the lower eyelid search window W2 fits the pixels constituting the edge of the lower eyelid. Then, as seen with reference to FIG. 14, the lower eyelid search window W2 presented by broken lines is transformed into the one presented by solid lines, which overlaps with the pixels constituting the edge of the lower eyelid. Then, the position of the centroid of the transformed lower eyelid search window W2 is set as the lower eyelid reference position.

In other words, this embodiment sets the centroid of the lower eyelid search window W2 made to fit the pixels constituting the edge of a lower eyelid as the reference position. Therefore, the lower eyelid reference position can be accurately set even if the lower eyelid search window W2 is different in shape from the edge of a lower eyelid. Then, it is possible to accurately detect the degree of opening of the eyes of the driver 50 and thus accurately determine the degree of wakefulness of the driver 50.

If the camera as the photographing device 30 is installed below the face of the driver 50, the shape of the lower eyelid appearing in images varies depending on in which direction the driver is facing. Particularly, when the tears bags are bulging, the edge of the lower eyelid, which is actually a curve convex downward, may appear to be a curve convex upward. In such a case, the lower eyelid search window W2 is significantly different in shape from the edge of the lower eyelid and it is difficult to accurately detect the positions of the lower eyelids.

Figure 16:
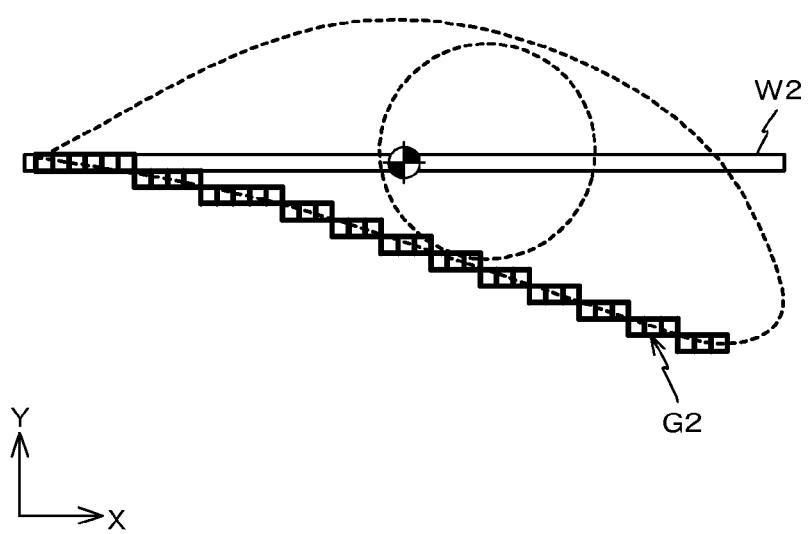
FIG. 16 is an illustration showing the centroid of the untransformed lower eyelid search window.

More specifically, if the lower eyelid search window W2 is significantly different in shape from the edge of the lower eyelid, as shown in FIG. 16, the edge value may be maximized when the lower eyelid search window W2 coincides with the end pixels among the group of pixels G2 constituting the edge of a lower eyelid. In such a case, if the centroid of the untransformed lower eyelid search window W2 is set as the reference point of the lower eyelid, the reference point is largely shifted from the edge of the lower eyelid and thus it is impossible to accurately detect the degree of opening of the eye. On the other hand, in this embodiment, the centroid of the lower eyelid search window W2 made to fit the pixels constituting the lower eyelid is set as the reference point of the lower eyelid. Therefore, the reference position of the lower eyelid can be accurately set. Consequently, it is possible to accurately detect the degree of opening of the eyes of the driver 50 and thus accurately determine the degree of wakefulness of the driver 50.

In the above embodiment, the centroid of the upper eyelid search window W1 is calculated based on the average coordinates of the pixels overlapping with the transformed lower eyelid search window W2. This is not restrictive and the centroid can be calculated based on the pixels weighted according to the brightness of the pixel or the edge scores. More specifically, the X-coordinate $X_G$ and Y-coordinate $Y_G$ of the centroid can be calculated using the formulae (1) and (2) below, respectively, in which es$_i$ is the edge value of a pixel at a position (x$_i$, y$_i$).

[Math 1]

$$X_G = \frac{\sum (x_i \cdot es_i)}{\sum es_i} \quad (1)$$

-continued

[Math 2]

$$Y_G = \frac{\sum (y_i \cdot es_i)}{\sum es_i} \quad (2)$$

Furthermore, in the above embodiment, the centroid of the lower eyelid search window W2 is set as the reference position of the lower eyelid search window W2. This is not restrictive and the reference position of the lower eyelid search window W2 can be the center of the lower eyelid search window W2. The center can be a point having the X-coordinate expressed by (xe1+xe2)/2 in which xe1 and xe2 are the X-coordinates of the ends of the lower eyelid search window W2 and situated on the lower eyelid search window W2.

Embodiment 2

Embodiment 2 of the present invention will be described hereafter with reference to the drawings. The same or equivalent components as or to those in Embodiment 1 are referred to by the equivalent reference numbers and their explanation will be omitted or simplified.

Figure 17:
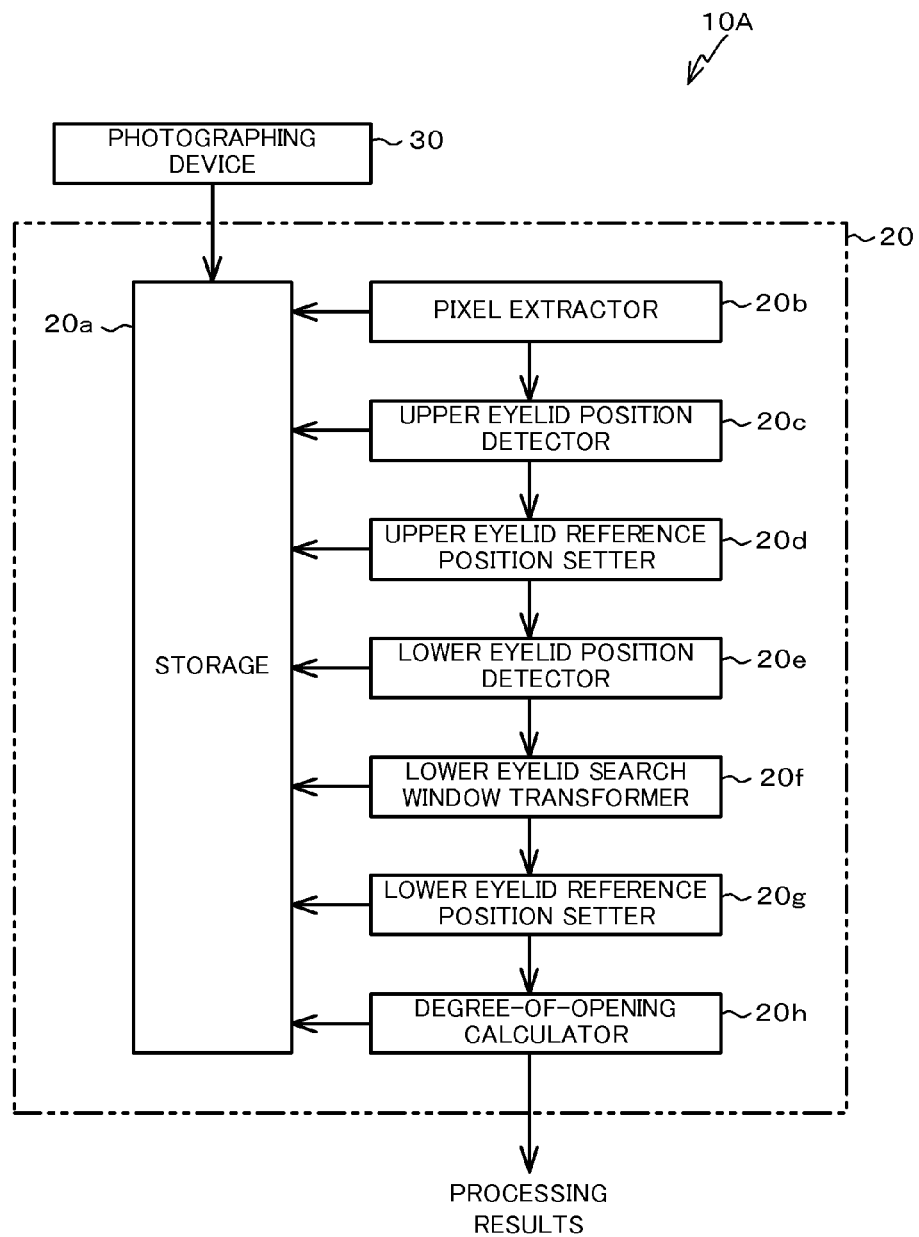
FIG. 17 is a block diagram of the eyelid detection device according to Embodiment 2.

An eyelid detection device 10A according to this embodiment is different from the eyelid detection device 10 according to Embodiment 1 in that the calculation device 20 is configured by hardware. As shown in FIG. 17, the eyelid detection device 10 has a storage 20a, a pixel extractor 20b, an upper eyelid position detector 20c, an upper eyelid reference position setter 20d, a lower eyelid position detector 20e, a lower eyelid search window transformer 20f, a lower eyelid reference position setter 20g, and a degree-of-opening calculator 20h.

The storage 20a stores information regarding images output from the photographing device 30 and information including the results of processing by the components 20b to 20f in sequence.

The pixel extractor 20b processes the image IM using a Sobel filter to extract the edges contained in the image IM. Then, the edge presenting the outline F of the face of the driver is detected among the extracted edges. Then, the edges presenting the eyebrows and mouth of the driver are detected among the edges contained in the area enclosed by the outline F of the face of the driver so as to roughly identify the positions of the eyebrows and mouth of the driver. As the positions of the eyebrows and mouth are identified, the pixel extractor 20b detects, for example as shown in FIG. 4, the smallest rectangular area nearly equal in dimension in the X-axis direction to the outline of the face and containing the eyebrows and mouth of the driver 50 as the face area A1.

The positions of the eyebrows, eyes, nose, and mouth constituting a face are more or less different among individuals; however, their positions can roughly be identified based on the outline and parts such as eyebrows and eyes of the face. Then, an area in which the eyes are situated can be specified in the face area A1 defined to contain the eyebrows at the upper end and the mouth at the lower end with some degree of accuracy. Then, the pixel extractor 20b defines a rectangular search area A2 that is long in the X-axis direction below the image of the eyebrows contained in the face area A1.

Then, the pixel extractor 20b executes a procedure to detect the edges in the search area A2. For detecting the edges, the pixel extractor 20b uses the horizontal edge detection operator shown in FIG. 5A and the vertical edge detection operator shown in FIG. 5B. As a result of the edge detection procedure, for example as shown in FIG. 6, the pixels D constituting the edges of the upper and lower eyelids of the eyes 51 and 52 are extracted. In the following explanation, the edge of the upper eyelid of the right eye 51 is referred to as a group of pixels G1 and the edge of the lower eyelid thereof is referred to as a group of pixels G2. Furthermore, the edge of the upper eyelid of the left eye 52 is referred to as a group of pixels G3 and the edge of the lower eyelid thereof is referred to as a group of pixels G4.

The upper eyelid position detector 20c conducts scanning using the upper eyelid search window W1 to detect the positions of the upper eyelids. More specifically, the upper eyelid position detector 20c moves the upper eyelid search window W1 within the search area A2, for example, by a distance corresponding to one pixel at a time. Simultaneously, the upper eyelid position detector 20c calculates the total of the edge values of the pixels D overlapping with the horizontal edge window P1 plus a value obtained by subtracting the total of the edge values of the pixels overlapping with the vertical edge window P3 from the total of the edge values of the pixels D overlapping the vertical edge window P2 as the evaluation value in sequence. Then, the upper eyelid position detector 20c detects the position of the upper eyelid search window W1 where the evaluation value is maximized as the position of the upper eyelid of the right eye 51. The upper eyelid position detector 20c further detects the position of the upper eyelid of the left eye 52 in the same procedure.

The upper eyelid reference position setter 20d sets the reference positions of the detected upper eyelids of the right and left eyes 51 and 52. More specifically, as shown in FIG. 8, the upper eyelid reference position setter 20d sets the position on the XY-coordinate system that coincides with the centroid of the upper eyelid search window W1 overlapping with the group of pixels G3 as the upper eyelid edge reference position C1 of the right eye 51. Similarly, the upper eyelid reference position setter 20d sets the position on the XY-coordinate system that coincides with the centroid of the upper eyelid search window W1 overlapping with the group of pixels G3 as the upper eyelid reference position C1 of the left eye 52.

The lower eyelid position detector 20e first sets lower eyelid search areas. The lower eyelids are situated below the upper eyelids. Then, as shown in FIG. 9, the lower eyelid position detector 20e sets a rectangular lower eyelid search area A3 in the user part of which the group of pixels G1 constituting the edge of the upper eyelid is situated. Similarly, the lower eyelid position detector 20e sets a rectangular lower eyelid search area A4 in the upper part of which the group of pixels G3 is situated.

Then, the lower eyelid position detector 20e conducts scanning using a lower eyelid search window to detect the positions of the lower eyelids. As shown in FIG. 10, the lower eyelid search window W2 is a window that is long in the X-axis direction. The lower eyelid search window W2 is equal in dimension in the Y-axis direction to a pixel D. Furthermore, the lower eyelid search window W2 is equal in dimension in the X-axis direction to the upper eyelid search window W1.

The lower eyelid position detector 20e moves the lower eyelid search window W2 within the lower eyelid search area A3, for example, by a distance corresponding to one pixel at a time. Simultaneously, the lower eyelid position detector 20e calculates the total of the edge values of the pixels D overlapping with the lower eyelid search window W2 as the evaluation value. Then, the lower eyelid position detector 20e detects the position of the lower eyelid search window W2 where the evaluation value is minimized as the position of the lower eyelid of the right eye 51. Similarly, the lower eyelid position detector 20e executes the above-described processing using the lower eyelid search window W2 also in the lower eyelid search area A4.

The lower eyelid search window transformer 20f transforms the lower eyelid search window W2 based on the distribution of the pixels constituting the group of pixels G2. More specifically, the lower eyelid search window transformer 20f sets, as shown in FIG. 12, pixel search windows W3 and W4 having a dimension of 3d in the Y-axis direction and a dimension of d in the X-axis direction at the ends of a group $G2_5$ overlapping with the lower eyelid search window W2. Then, the lower eyelid search window transformer 20f moves the pixel search window W3 in the −X direction to extract the pixels D overlapping with the pixel search window W3. Consequently, the pixels constituting a group $G2_4$ are extracted. Similarly, the lower eyelid search window transformer 20f moves the pixel search window W4 in the +X direction to extract the pixels D overlapping with the pixel search window W4. Consequently, the pixels constituting a group $G2_6$ are extracted.

Then, the lower eyelid search window transformer 20f transforms the lower eyelid search window W2 so that the lower eyelid search window W2 overlaps with the pixels D constituting the group $G2_5$ and already overlapping with the pixel search window W4 and the pixels D constituting the groups $G2_4$ and $G2_6$ and extracted with the pixel search windows W3 and W4 as shown in FIG. 13. Consequently, the lower eyelid search window W2 comprises three rectangular frames as shown in FIG. 13.

Then, the lower eyelid search window transformer 20f sets the pixel search window W3 at the end of the group $G2_4$ in the −X direction and the pixel search window W4 at the end of the group $G2_6$ in the +X direction. Then, the lower eyelid search window transformer 20f moves the pixel search windows W3 and W4 in the −X direction and in the +X direction, respectively, to extract the pixels overlapping with the pixel search windows W3 and W4 and constituting groups $G2_3$ and $G2_7$, respectively.

Then, the lower eyelid search window transformer 20f transforms the lower eyelid search window W2 so that the lower eyelid search window W2 overlaps with the extracted pixels. The lower eyelid search window transformer 20f repeatedly executes the above processing. Consequently, as shown in FIG. 14, the lower eyelid search window W2 is transformed so that the lower eyelid search window W2 completely overlaps with the group of pixels G2 presenting the edge of the lower eyelid. Furthermore, the lower eyelid search window transformer 20f executes the above-described processing also on the lower eyelid search window W2 overlapping with the group of pixels G4.

The lower eyelid reference position setter 20g sets lower eyelid reference positions. More specifically, the lower eyelid reference position setter 20g calculates the centroid of the lower eyelid search window W2 transformed by the lower eyelid search window transformer 20f. Then, the lower eyelid reference position setter 20g sets the position of the calculated centroid on the XY-coordinates as a lower eyelid reference position C2. Furthermore, the lower eyelid reference position setter 20g executes the above-described processing also on the lower eyelid search window W2 overlapping with the group of pixels G4.

As shown in FIG. 15, the degree-of-opening calculator 20h measures the distance between the upper eyelid reference position C1 and lower eyelid reference position C2 in each of the right eye 51 and left eye 52. Then, the degree-of-opening calculator 20h outputs the result of comparison of the distance with a given threshold as the degree of opening. Consequently, using the degree of opening as an indicator, the degree of wakefulness of the driver 50 can be determined.

As described above, for detecting a lower eyelid, Embodiment 2 first conducts scanning using the lower eyelid search window W2. Then, the lower eyelid search window W2 at the position where the total of the edge values of the pixels D overlapping with the lower eyelid search window W2 (the evaluation value) is maximized is transformed so that the lower eyelid search window W2 fits the pixels constituting the edge of the lower eyelid. Then, the position of the centroid of the transformed lower eyelid search window W2 is set as the lower eyelid reference position.

In other words, this embodiment sets the centroid of the lower eyelid search window W2 made to fit the pixels constituting the edge of a lower eyelid as the reference position. Therefore, the lower eyelid reference position can be accurately set even if the lower eyelid search window W2 is different in shape from the edge of the lower eyelid. Then, it is possible to accurately detect the degree of opening of the eyes of the driver 50 and thus accurately determine the degree of wakefulness of the driver 50.

Embodiments of the present invention are described above. The present invention is not confined to the above embodiments.

For example, in the above embodiments, the lower eyelid search window W2 for searching for the edges of the lower eyelids is transformed and the centroid of the transformed lower eyelid search window W2 is set as the reference position. This is not restrictive. It is possible to transform the upper eyelid search window W1 so that the upper eyelid search window W1 overlaps with the pixels constituting the edges of the upper eyelids and set the centroid of the transformed upper eyelid search window W1 as the upper eyelid reference position.

In the above embodiments, the centroid of the lower eyelid search window W2 is set as the eyelid reference position. This is not restrictive. For example, it is possible to make a curve of which the ends coincide with the inner and outer corners of an eye, respectively, fit the pixels overlapping with the lower eyelid search window W2 and set the vertex of the fitted curve as the reference position. Incidentally, the inner and outer corners of an eye in an image can be identified by a known technique using a template as disclosed, for example, in Unexamined Japanese Patent Application Kokai Publication No. 2008-226125.

Furthermore, the procedure to identify the inner corner of an eye and the like can be executed only with areas around the transformed lower eyelid search window W2. More specifically, it is sufficient to set the ends of the transformed lower eyelid search window W2 as the reference positions and execute the procedure to identify the inner corner of an eye and the like with areas around these reference positions. Consequently, the search procedure using a template can be expedited.

In the above embodiments, the lower eyelid search window W2 is rectangular. This is not restrictive. The lower eyelid search window W2 can be curved so as to be convex downward or convex upward.

In the above embodiments, the distance between the upper eyelid reference position C1 and lower eyelid reference position C2 is measured and the result of comparison of the distance with a threshold is output as the degree of opening. This is not restrictive. It is possible to draw a normal line parallel to the Y-axis from the reference position C1 to the transformed lower eyelid search window W2 and output the result of comparison of the length of the normal line with a threshold as the degree of opening.

The function of the calculation device 20 according to the above embodiments can be realized by dedicated hardware or a conventional computer system.

The programs stored in the auxiliary storage 23 of the calculation device 20 in Embodiment 1 can be stored and distributed on a computer readable recording medium such as a flexible disk, CD-ROM (compact disk read-only memory), DVD (digital versatile disk), and MO (magnetooptical disk), and then the programs can be installed on a computer so as to configure a device executing the above-described processing.

It is further possible to store the programs on a disk device of a given server unit on a communication network such as the Internet and superimpose on carrier waves and download the programs on a computer.

It is further possible to start and run the programs while transferring them via communication networks.

It is further possible to run all or some of the programs on a sever unit and execute the above-described image processing while transmitting/receiving information regarding the processing via communication networks.

When the above-described function is partly realized by an OS (operation system) or realized by cooperation of an OS and application programs, only the non-OS part can be stored and distributed on a medium or downloaded on a computer.

Various embodiments and modifications are available to the present invention without departing from the broad sense of spirit and scope of the present invention. The above-described embodiments are given for explaining the present invention and do not confine the scope of the present invention.

INDUSTRIAL APPLICABILITY

The eyelid detection device, eyelid detection method, and program of the present invention is suitable for detecting the eyelid reference positions.

REFERENCE SIGNS LIST 10, 10A Eyelid detection device
20 Calculation device
20a Storage
20b Pixel extractor
20c Upper eyelid position detector
20d Upper eyelid reference position setter
20e Lower eyelid position detector
20f Lower eyelid search window transformer
20g Lower eyelid reference position setter
20h Degree-of-opening calculator
21 CPU
22 Main storage
23 Auxiliary storage
24 Display
25 Inputter
26 Interface
27 System bus
30 Photographing device
50 Driver
51 Right eye
52 Left eye
A1 Face area
A2 Search area
A3, A4 Lower eyelid search area
C1, C2 Reference position
D Pixel
F Outline
G1 to G4 Group of pixels
IM Image
P1 Horizontal edge window
P2, P3 Vertical edge window
W1 Upper eyelid search window
W2 Lower eyelid search window
W3, W4 Pixel search window

| Reference Signs List | |
|---|---|
| 10, 10A | Eyelid detection device |
| 20 | Calculation device |
| 20a | Storage |
| 20b | Pixel extractor |
| 20c | Upper eyelid position detector |
| 20d | Upper eyelid reference position setter |
| 20e | Lower eyelid position detector |
| 20f | Lower eyelid search window transformer |
| 20g | Lower eyelid reference position setter |
| 20h | Degree-of-opening calculator |
| 21 | CPU |
| 22 | Main storage |
| 23 | Auxiliary storage |
| 24 | Display |
| 25 | Inputter |
| 26 | Interface |
| 27 | System bus |
| 30 | Photographing device |
| 50 | Driver |
| 51 | Right eye |
| 52 | Left eye |
| A1 | Face area |
| A2 | Search area |
| A3, A4 | Lower eyelid search area |
| C1, C2 | Reference position |
| D | Pixel |
| F | Outline |
| G1 to G4 | Group of pixels |
| IM | Image |
| P1 | Horizontal edge window |
| P2, P3 | Vertical edge window |
| W1 | Upper eyelid search window |
| W2 | Lower eyelid search window |
| W3, W4 | Pixel search window |

The invention claimed is:

1. An eyelid detection device, comprising:
a extractor extracting the pixels of which the edge values satisfy given conditions from the pixels constituting an image of the eyes of a driver;
a calculator calculating the evaluation value of the pixels overlapping with an window having a shape corresponding to the eyelids of the driver while scanning the image using the window;
a transformer transforming the window at the position where the evaluation value is maximized to increase the evaluation value of the window; and
a setter setting the reference positions of the eyelids according to the transformed window.

2. The eyelid detection device according to claim 1, wherein
the transformer detects the pixels situated near the ends of a group of pixels overlapping with the window and transforms the window so that the window overlaps with the detected pixels.

3. The eyelid detection device according to claim 1, wherein
the transformer scans a pixel search window in a first direction in which a group of pixels overlapping with the window is arranged to extract the pixels overlapping with the pixel search window, the pixel search window leading to a higher evaluation value in the second direction perpendicular to the first direction than the evaluation value in the second direction of the pixel, and transforms the window so that the window overlaps with the extracted pixels.

4. The eyelid detection device according to claim 3, wherein the pixel search window overlaps with the pixel at the position shifted from the pixels overlapping with the window by one pixel in the second direction.

5. The eyelid detection device according to claim 1, wherein the evaluation value is the absolute value of the total of the edge values of the pixels overlapping with the window.

6. The eyelid detection device according to claim 1, wherein the reference position is the centroid of the window.

7. The eyelid detection device according to claim 1, comprising:

a curve calculator calculating a curve fitting the pixels overlapping with the transformed window, wherein the setter sets the vertex of the curve as the reference position.

8. The eyelid detection device according to claim 1, wherein the setter sets the ends of the transformed window as the reference positions.

9. The eyelid detection device according to claim 1, wherein the extractor extracts the pixels of which the edge values are equal to or higher than a threshold or the pixels of which the edge values are equal to or lower than a threshold.

10. The eyelid detection device according to claim 1, comprising a photographing device photographing the image.

11. An eyelid detection method, including the following steps:

extracting the pixels of which the edge values satisfy given conditions from the pixels constituting an image of the eyes of a driver;

calculating the evaluation value of the pixels overlapping with an window having a shape corresponding to the eyelids of the driver while scanning the image using the window;

transforming the window at the position where the evaluation value is maximized to increase the evaluation value of the window; and setting the reference positions of the eyelids according to the transformed window.

12. A non-transitory recording medium on which is recorded a program allowing a computer to execute the following procedures:

extracting the pixels of which the edge values satisfy given conditions from the pixels constituting an image of the eyes of a driver;

calculating the evaluation value of the pixels overlapping with an window having a shape corresponding to the eyelids of the driver while scanning the image using the window;

transforming the window at the position where the evaluation value is maximized to increase the evaluation value of the window; and setting the reference positions of the eyelids according to the transformed window.

* * * * *